United States Patent
Kamps

(10) Patent No.: US 6,998,602 B2
(45) Date of Patent: Feb. 14, 2006

(54) METHOD OF AND AN APPARATUS FOR MEASURING A SPECIMEN BY MEANS OF A SCANNING PROBE MICROSCOPE

(75) Inventor: Jörn Kamps, Berlin (DE)

(73) Assignee: JPK Instruments AG, Berlin (DE)

( * ) Notice: Subject to any disclaimer, the term of this patent is extended or adjusted under 35 U.S.C. 154(b) by 0 days.

(21) Appl. No.: 10/490,440

(22) PCT Filed: Sep. 24, 2002

(86) PCT No.: PCT/DE02/03690

§ 371 (c)(1),
(2), (4) Date: Sep. 22, 2004

(87) PCT Pub. No.: WO03/028038

PCT Pub. Date: Apr. 3, 2003

(65) Prior Publication Data

US 2005/0023481 A1 Feb. 3, 2005

(30) Foreign Application Priority Data

Sep. 24, 2001 (DE) ................................ 101 47 868

(51) Int. Cl.
*H01J 3/14* (2006.01)

(52) U.S. Cl. ...................................... 250/234; 73/105

(58) Field of Classification Search ................ 250/234, 250/306; 73/105

See application file for complete search history.

(56) References Cited

U.S. PATENT DOCUMENTS

| 5,616,916 A | 4/1997 | Handa et al. |
| 6,032,518 A | 3/2000 | Prater et al. |
| 6,910,368 B1 * | 6/2005 | Ray .............................. 73/105 |

FOREIGN PATENT DOCUMENTS

EP 0 564 088 A 10/1993

OTHER PUBLICATIONS

Werf Van Der. K. et al., "Compact Stand-Alone Atomic Force Microscope", Review of Scientific Instruments, Oct., 1993, pp. 2892-2897, vol. 64, No. 10, American Institute of Physics, New York.

* cited by examiner

*Primary Examiner*—Kiet T. Nguyen
(74) *Attorney, Agent, or Firm*—Smith Patent Office

(57) ABSTRACT

The invention relates to a method of and an apparatus for measuring a specimen by means of a scanning probe microscope, especially a scanning force microscope, wherein a probe (5) is displaced with respect to a specimen (6) by means of lateral and vertical shifting units (1) to measure the specimen (6); measuring light rays (21) are generated by means of a light source (20) and directed to a reflection means (91) disposed on the probe; the measuring light rays (21) are reflected at the reflection means (91), whereby reflected measuring light rays (21$a$) are formed; and the reflected measuring light rays (21$a$) are directed by means of a correction lens (47) to a detector surface (32) of a detector means (27) to generate a measurement signal, the correction lens (47) being positioned at a distance from the detector surface (32) substantially corresponding to a focal length of the correction lens (47).

11 Claims, 3 Drawing Sheets

METHOD OF AND AN APPARATUS FOR MEASURING A SPECIMEN BY MEANS OF A SCANNING PROBE MICROSCOPE

The invention concerns methods and apparatus for scanning probe microscopy (SPM).

Scanning force microscopy (SFM) (AFM—atomic force microscopy) is one form of scanning probe microscopy. An important field of application of scanning probe microscopy is the determination of the topography of a specimen surface with high lateral and vertical resolution. The term "lateral resolution" in this context refers to the resolution in a plane of the surface under examination. The direction perpendicular to this plane is called vertical direction. In vertical direction, the topography of the surface is determined by vertical resolution. In addition to the topology, other characteristics of a specimen to be examined can be measured, such as the elasticity or forces of adhesion. Also optical near field microscopes belong to the class of scanning probe microscopes (SNOM—scanning near field optical microscope).

To be able to undertake scanning probe microscopy, the spacing between a probe and the specimen to be examined must be adjustable and measurable very precisely. Probes used in connection with scanning probe microscopes, for instance, are measuring beams which are called cantilevers. A force between the cantilever and the specimen under examination is evaluated as a measurement parameter, especially in scanning force microscopes, a force which may be described, in the simplest case, by a Lenard-Jones potential. There are several ways of detecting the force. In the simplest case, the excursion of the probe is measured. With scanning force microscopy, when using a cantilever, the probe typically is designed as a thin spring pole. Likewise known are measuring methods with which the cantilever is excited so as to oscillate. Then the damping of the amplitude of the resulting oscillation is controlled. What the known measuring methods have in common is that the interaction between the cantilever and the specimen under examination is measured. As used in the present context, the term "scanning probe microscopy" comprises all these methods and the respective microscopes which are made use of with them.

With one known measuring method, the force acting on the cantilever is detected by applying a light spot principle (light pointer). According to this principle, a measuring ray of light, especially a laser beam is directed at the cantilever, with focussing being provided, if desired. In response to bending of the cantilever, the light beam is reflected at a certain angle with respect to the direction of the incident light, either from the cantilever or from a structural member connected to the cantilever. The reflected light beam is directed at a photodiode which comprises a detector surface having at least two segments. A difference in the light signals received at the two segments is an indication that the measuring light beam is remote from a midposition between the two segments. The midposition is defined as being located where equal portions of the reflected light beam impinge on both segments. Bending of the cantilever provokes a change in the equal distribution of the reflected light beam across both segments. If it is desired, in addition, to detect torsion of the cantilever a photodiode having four segments may be used since that permits the position of the reflected light beam to be determined in two directions on the photodiode. Knowing a cantilever spring rate, the force between the cantilever and the specimen under examination can be determined based on the measurement of the bending of the cantilever.

With a scanning probe microscope, the cantilever may be made, for instance, of silicon. Materials, such as SiN3 or diamond likewise may be used. Basically, the measuring method according to the light spot approach is independent of the material of which the cantilever or measuring tip is made.

When scanning the specimen with the help of the cantilever, usually the distance in vertical direction between the specimen and the cantilever must be adjusted accurately by means of relative movement between the specimen and the cantilever. In this manner, for example, a constant force ratio may be adjusted. Piezoelectric elements may be used to adjust the spacing. During a measurement, the cantilever at the same time carries out scanning-type motion in lateral direction with respect to the specimen. In princple, either the specimen or the cantilever may be moved. If it is the cantilever that moves this is referred to as a "stand-alone scanning probe microscope". However, the cantilever also might be moved laterally and the specimen to be examined might be moved vertically, or vice versa.

Two approaches are known, at the present time, in connection with stand-alone scanning probe microscopes to implement the light spot principle. With one approach, all the components of the light spot are moved along in all three directions in space. In this case the light spot is independent of the cantilever movement and simply indicates bending of the cantilever. This kind of implementation is disadvantageous in that it requires various setting means for adjusting the light source which generates the measuring light rays. The complete mass of the resulting mechanical structure must be moved along, and a mechanical resonant frequency of the measuring system is greatly reduced, especially also in vertical direction. The mechanical structure altogether must be implemented in but little space.

With a second type of implementation, the cantilever alone is moved in all three directions in space. In this case, however, measures must be taken to make sure that the measuring light rays still impinge on the cantilever as it moves so as to be reflected from the same. Imaging of the reflected measuring light on the photodiode is not possible unless lateral tracking of the measuring light rays is provided, especially when measurements are made which require scanning of large areas by means of the cantilever. Various methods have been proposed for tracking the measuring light. These methods are successful in that the intensity of the reflected measuring light rays remains unchanged or is varied only a little as the cantilever is moved. If the cantilever does not bend the photodiode signal obtained due to the reflected measuring light rays is completely or almost completely constant. However, this method has the disadvantage that the lateral tracking of the measuring light rays does not permit simultaneous correction of a vertical measuring error which also exists. A vertical measuring error occurs when the cantilever, rather than being oriented at right angles to the direction of incidence of the measuring light rays, is slightly inclined.

It is an object of the invention to indicate an improved method and an improved apparatus for a scanning probe microscope offering improved correction of measured value distortions.

This object is met, in accordance with the invention, by a method as recited in independent claim 1 and an apparatus as recited in independent claim 7.

The invention comprises the essential concept that, when measuring a specimen by means of a scanning probe microscope, applying the light spot principle, the elements belonging to the light spot feature be coupled to a lateral shifting unit in such a way that the light spot arrangement as a whole becomes displaced when the probe is moved in lateral direction with respect to the specimen to be examined. As a result hereof the light spot elements are kept at rest with respect to one another. In vertical direction, on the other hand, movement of a reflection means on the probe, comprised by the light spot, with respect to the remainder of the light spot elements is allowed, especially the light source for generating measuring light rays and the detector means by which reflected measuring light rays are detected to generate a measurement signal, said reflected measuring light rays resulting from reflection of the measuring light rays at the reflection means. With such a light spot measuring assembly, any vertical displacement of the probe, and thus of the reflection means, with respect to the other light spot elements produces a parallel offset of the reflected measuring light rays. To make sure that this does not lead to distortions of measured values, it is proposed that a correction lens be utilized which focusses the reflected measuring light rays on a detector surface of the detector means. The correction lens is disposed at a distance from the detector surface substantially equal to the focal length of the correction lens. The distance between the correction lens and the detector surface must lie within certain limits of error which normally can be resolved within such apparatus, the absolute value thereof depending on the measure for the focal length. If, for example, the focal length is some millimeters or a few centimeters, the distance may differ by a some micrometers from the exact value of the focal length, provided the latter can be adjusted at all with such a degree of precision. What is essential is that the reflected measuring light rays, in spite of the parallel offset, are focussed into the same area on the detector surface, within the limits of precision of the respective measurement. This means that relative movement of the probe or the reflection means disposed on the same with respect to the light source and the detector means does not lead to distortions of measured values because a correction is performed by means of the correction lens.

In accordance with a convenient further development of the method according to the invention the measuring light rays are directed to the reflection means with the aid of optical deflection means. This permits optimized designing of the path of the measuring light rays from the light source to the reflection means in response to the respective measuring assembly chosen. In particular, it may be provided that the measuring light rays travel substantially centrally with respect to the measuring assembly in a section of their path directly upstream of the reflection means.

In order to be able to direct also the reflected measuring light rays upon their origination at the reflection means in optimized manner to the detector surface of the detector means, depending on the case of application, a modification of the invention may provide for the reflected measuring light rays to be directed to the detector surface with the aid of further optical deflection means.

Optimized light impingement of the measuring light rays on the reflection means at the probe and of additional condenser illumination on an area in which the probe is disposed above the specimen can be achieved, with a preferred embodiment of the invention, by guidance of the measuring light rays in a light path from the light source to the reflection means at least partly along a condenser light path. Thus the condenser light path may be utilized for transmitting the measuring light rays in addition to spreading the condenser light.

Distortions of measured values are minimized, with a convenient embodiment of the invention, in that a value of about ≦30 degrees is chosen for an angle of incidence of the measuring light rays with respect to a normal of the reflection means.

A preferred further development of the invention offers the possibility of observing the specimen through an optical microscope at the same time that the scanning probe microscopic examination is under way. To this end the specimen is illuminated by condenser light which spreads through a condenser light path.

The features mentioned in subclaims to the apparatus for measuring a specimen by means of a scanning probe microscope offer the advantages mentioned in connection with the associated method claims accordingly.

The invention will be explained in greater detail below with reference to embodiments.

Figure 1:
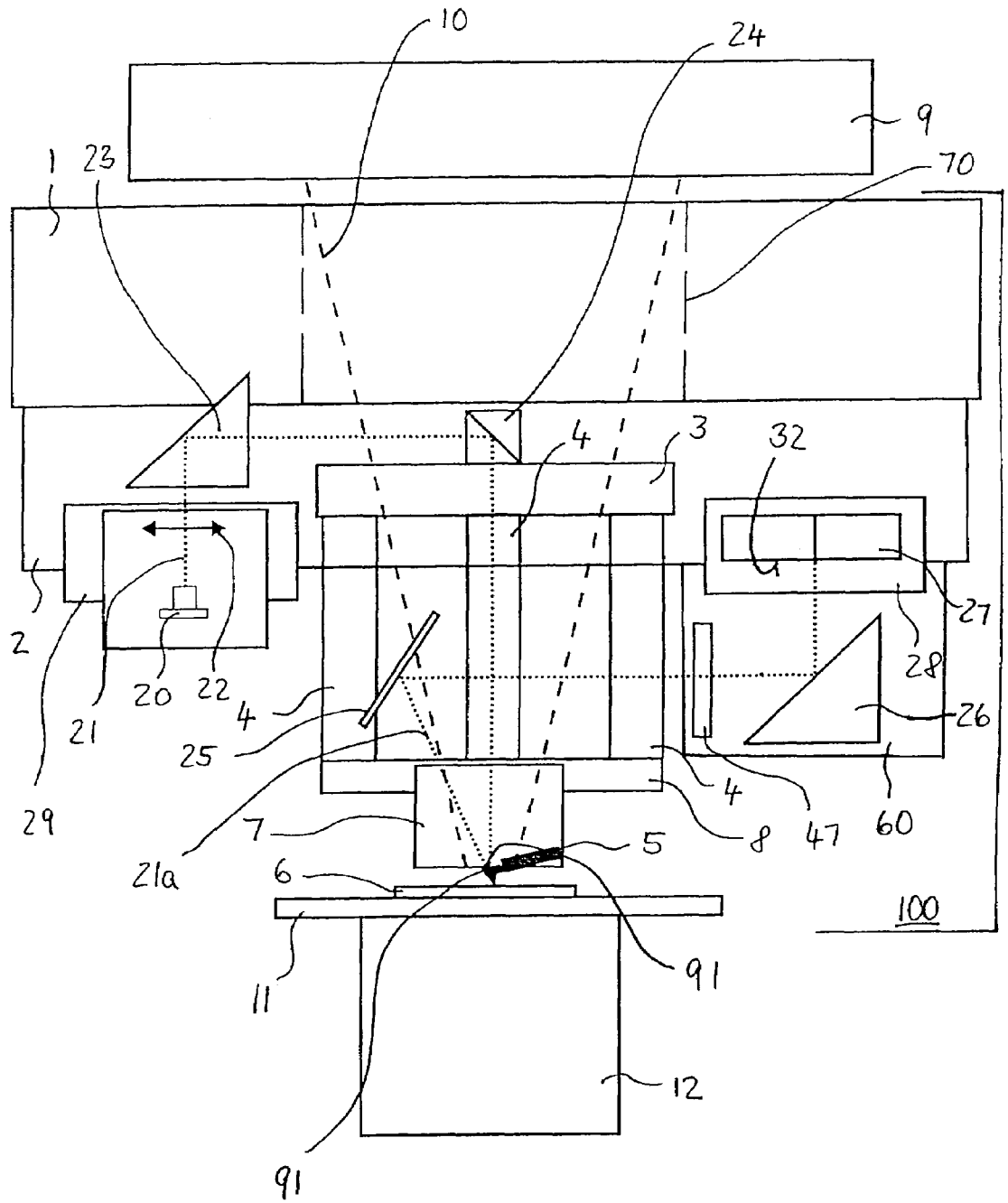
FIG. 1 is a diagrammatic illustration of a measuring assembly for a scanning probe microscope, comprising a transillumination microscope.

FIG. 1 diagrammatically shows a measuring assembly 100 for a scanning probe microscope, especially a scanning force microscope, comprising a lateral shifting unit 1 which permits precise movement of the other structural elements connected to the lateral shifting unit 1 in a plane extending vertically to the plane of the drawing in FIG. 1. The lateral shifting unit 1 may be composed, for example, of piezoelectric elements. In principle, however, any desired kind of apparatus may be used as long as they permit accurate displacement in a plane. A frame member 2 is mounted on the lateral shifting unit. Further structural members of the arrangement shown in FIG. 1 for a scanning probe microscope are fastened to the frame member 2 in a way so as to be movable in lateral direction with the aid of the lateral shifting unit 1.

A glass plate 3 is retained on the frame member 2. A plurality of vertical shifting units 4, preferably embodied by piezoelectric structural elements are mounted on the glass plate 3. The vertical shifting units 4 are arranged so as not to extend into the condenser light path 10, at least not so as to disturb it. Nevertheless the vertical shifting units 4 are placed as closely as possible to the condenser light path 10 so as to offer a high degree of stability.

Precise positioning of a probe 5 provided to carry out the scanning probe microscopic examinations, embodied by a so-called cantilever in the case of a scanning probe microscope, is accomplished in vertical direction, perpendicular to the lateral shifting plane, by the vertical shifting unit 4. That is required for adjusting and measuring the distance between the probe 5 and a specimen 6 with a high degree of precision. The probe 5 is mounted on a glass body 7 which in turn is coupled by an annular member 8 to the plurality of lateral shifting units 4. A defined transition from air to water must be given in order to render the measuring assembly 100 suitable also for applications under liquids. This is enabled by the glass body 7 which is dimensioned so as not to obstruct the condenser light path 10. The glass body 7 preferably is formed with a groove to permit the probe 5 to be installed at an inclination with respect to the plane of the specimen.

Condenser lighting 9 is provided above the measuring assembly 100 and above the lateral shifting unit 1 to generate condenser light. In FIG. 1, a condenser light path 10 has a conical configuration, as depicted in dashed lines. The condenser light path 10 extends substantially centrally through the lateral shifting unit 1, formed for this purpose with an opening 70, further through the glass plate 3, the annular member 8, and the glass body 7, thus illuminating the specimen 6 placed on a specimen support 11. The specimen support 11 may be a commercially available microscope slide or a Petri dish. The condenser lighting 9 serves for examining the specimen 6 with the aid of an objective 12 which is disposed underneath the specimen support 11.

The embodiment of the measuring assembly 100 illustrated in FIG. 1 for a scanning probe microscope thus permits the specimen 6 to be illuminated with condenser light even if the specimen 6 is disposed on the specimen support 11 for a scanning probe microscopic examination. The condenser light may spread in typical manner, for instance, conically along the condenser light path 10. To avoid any obstruction of the spreading of condenser light, those components of the arrangement according to FIG. 1 which are disposed in the range of the condenser light path 10 are provided, for example, with openings through which the condenser light may pass, or they are made of a material which is transparent to light, such as the glass plate 3 and the glass body 7. Deflection of the condenser light by means of additional optical elements on the way from the condenser lighting 9 to the specimen 6 is not required. Such optical deflections, as a rule, lead to reduced quality of the illumination of the specimen 6 for optical microscopic examination through the objective 12.

The specimen 6 may be subjected to a scanning probe microscopic examination by means of the measuring assembly 100 illustrated in FIG. 1. To that end, a light source 20, preferably embodied by a laser light source, generates measuring light rays 21 which are directed through a focussing lens 22, a prism 23, and a beam splitter 24 onto the probe 5. The size of the beam splitter 24 and its spacing from the specimen 6 are so selected that phase rings of the light from the condenser lighting 9, enabling the phase contrast, either pass by the beam splitter 24 on the outside or entirely through the beam splitter 24. The holder (i.e. the glass plate 3) of the beam splitter 24 is made of glass or another transparent material to let the light from the condenser lighting 9 travel completely undisturbed past the beam splitter 24. A different kind of retention might be provided, such as by a metal frame, but it would cause considerable disturbance of the condenser light path 10.

In accordance with the light spot principle, the measuring light rays 21 which are incident on the probe 5 are reflected, and the reflected measuring light rays 21a are guided via a deflection mirror 25 and another prism 26 to a photodiode 27. The photodiode 27 conveniently comprises a detector surface 32 having two segments. The distribution of the reflected measuring light rays 21a between the two segments of the detector surface of the photodiode 27 varies in response to the bending of the probe 5. The signals generated in the area of the two segments are a measure of the bending of the probe 5. The bending of the probe 5 in turn is the consequence of the interaction between the probe 5 and the specimen 6. This is the usual light spot measuring principle which is applied with scanning probe microscopes, especially scanning force microscopes and, therefore, will not described in greater detail here.

The photodiode 27 is mounted on the frame member 2 by means of an adjustment unit 28. The light source 20 and the focussing lens 22 are mounted similarly on the frame member 2 by means of another adjustment unit 29.

Figure 2:
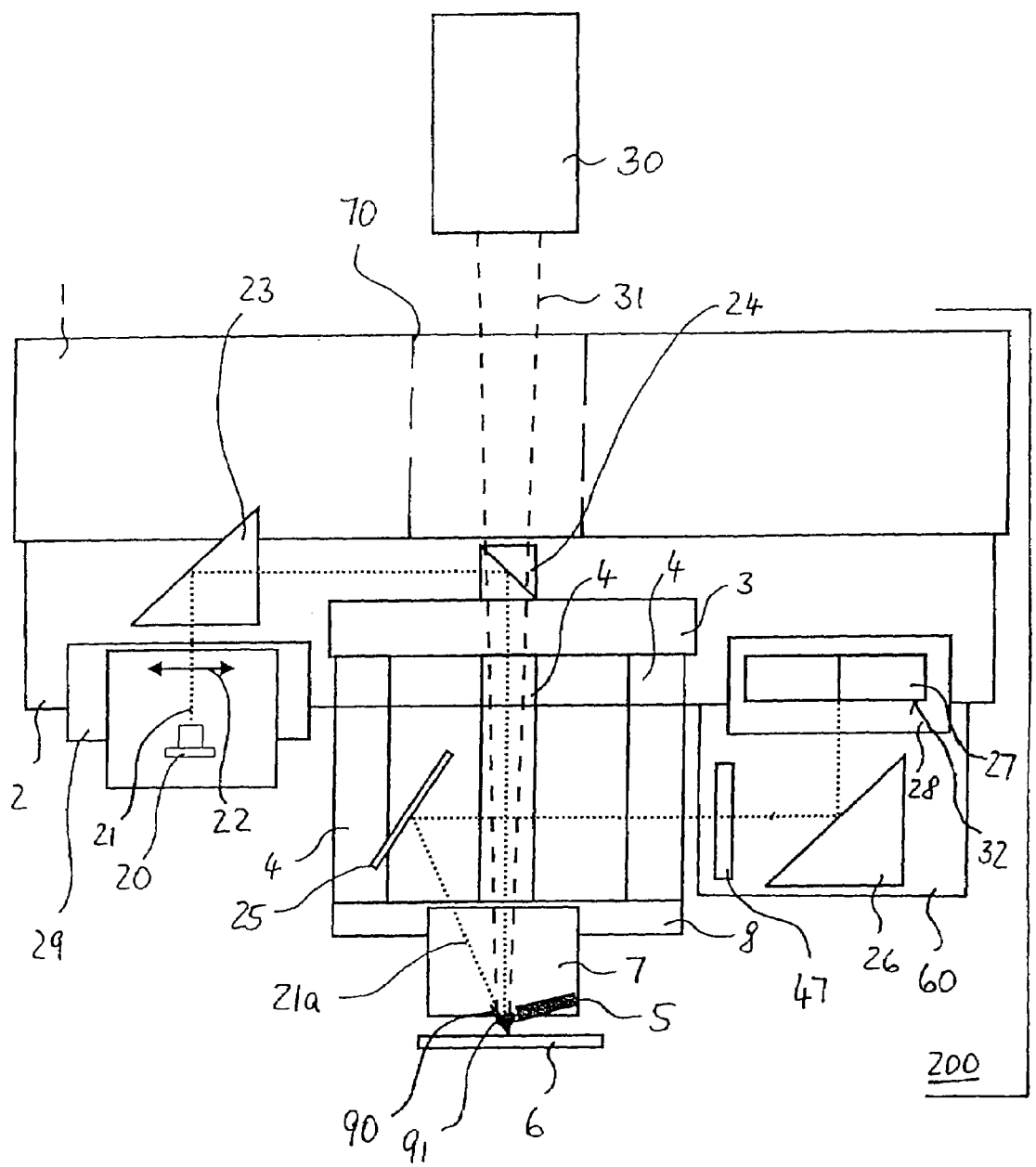
FIG. 2 is a diagrammatic illustration of the measuring assembly shown in FIG. 1, comprising a vertical illumination microscope.

FIG. 2 is a diagrammatic presentation of a measuring assembly 200 for a scanning probe microscope having the same features as the embodiment illustrated in FIG. 1. Other than in FIG. 1, however, a vertical illumination microscope 30 is provided for the optical microscopic examination of the specimen 6. The vertical illumination microscope 30 serves to collect light which is spreading from the specimen 6 through the measuring assembly 200 for the scanning probe microscopic examination to the vertical illumination microscope 30, along a condenser light path 31 which, in cross section, substantially has the shape of a cone section. As in FIG. 1, the course of the condenser light path 31 goes substantially centrally through the measuring assembly 200 shown in FIG. 2 and is designed to be sufficiently large, especially in cross section, so that light from a condenser (not shown in FIG. 2) may spread throughout the light path. When the specimen 6 is examined by means of the vertical illumination microscope 30 the condenser light path is utilized as a kind of observation channel or general light channel through which light may spread from the specimen 6 to the vertical illumination microscope 30. Upon deflection by the beam splitter 24, the measuring light rays 21 generated by the light source 20 propagate within the condenser light path 31 and substantially parallel to the condenser light 31, as is the case with the embodiment shown in FIG. 1, too.

The total height of the measuring assemblies 100 and 200, respectively, is restricted because of the provision of the condenser light paths 10 and 31, respectively. At present, the maximum working distances for commercially available condensers lie in a range of approximately 70 mm. Part of the total height, inherently, is taken up by the shifting units 1 and 4, respectively. Consequently, it is a condition that elements applied for measuring according to the light spot principle must do with but little height overall so as to meet the requirement of a compact design of the measuring assemblies 100 and 200, respectively.

Some of the structural members located above the specimen 6 and the probe 5 are made transparent to define the condenser light paths 10 and 31, respectively. Thereby and due to the stand-alone principle, the courses of the measuring light rays 21 and of the reflected measuring light rays 21a are severely restricted. The elements which make up the light spot, especially the light source 20, the focussing lens 25, the other adjustment unit 29, the prism 23, the beam splitter 24, as well as the deflection mirror 25, the other prism 26, a correction lens 47, the adjustment unit 28, the photodiode 27, and the probe 5 itself or a reflection element 91 fixed to the probe 5 to reflect the incident measuring light rays 21 all are connected mechanically to the lateral shifting unit 1 and are moved together with the lateral shifting unit 1. As a consequence, these elements are at rest with respect to one another while the specimen 6 is being scanned. This eliminates the need for tracking of the measuring light rays 21 on the probe 5. Therefore, the correction units so far provided in the art may be dispensed with, correction units which, by the way, might disturb the spreading of light along the condenser light paths 10 and 31, respectively. In vertical direction, on the other hand, of all the light spot elements, it is only the probe 5 or the reflection element 91 fixed to the probe 5 to reflect the incident measuring light rays 21 which are displaced by means of the vertical shifting unit 4. This displacement of the probe 5 causes relative movement of the probe 5 with respect to the remainder of the light spot elements. A means of correcting that will be described in greater detail below with reference to FIG. 3.

Basically, there are two possibilities for the course of the measuring light rays reflected at the probe 5 not to obstruct the condenser light paths 10 and 31, respectively. One possibility is to orient the probe 5 in parallel with the plane of the specimen 6 and pass the reflected measuring light rays back along their incident path. The two paths of rays, i.e. that of the measuring light rays incident on the probe 5 and that of the measuring light rays reflected at the probe 5, may be separated outside of the range of the condenser light paths 10 and 31, respectively, and the reflected measuring light rays be directed to the photodiode. Separation may be effected, for instance, by distinguishing the polarization. This procedure is disadvantageous in that it is rather difficult to secure the probe 5 such that its tip will be the lowest point of the measuring assemblies 100 and 200, respectively. This is particularly difficult if the specimens to be analyzed have very rough surfaces. True, the probe 5, for instance, may be glued to a cantilever chip. But this solution requires cumbersome removal from the fixture when exchanging the probe 5, for example. The cantilever chip also might be adhered by way of a thin liquid film. But that solution is not very secure.

An alternative solution for not impairing the condenser light paths 10 and 31, respectively, is to install the probe 5 at an inclination with respect to the specimen 6 so that the reflected measuring light rays 21a will be deflected far enough out of the condenser light paths 10 and 31, respectively, (see FIGS. 1 and 2). Thus no other structural elements, like the photodiode 27 disturb the condenser light paths 10 and 31, respectively. However, tilting the probe 5 too far may give rise to problems because the likelihood of getting distorted measured values due to the tip geometry of the probe 5 becomes ever greater. Furthermore, it was found that a minor local disturbance of the path of rays in the condenser light paths 10 and 31, respectively, does not lead to any relevant loss of resolution of the optical image. In the presently preferred embodiment, therefore, the probe 5 is tilted only slightly and the reflected measuring light rays 21a are blanked out by means of the deflection mirror 25 which interferes only slightly with the condenser light paths 10 and 31, respectively.

The novel arrangement of the light spot elements offers an additional advantage over known methods of correcting the measuring light rays in measurements according to the light spot principle by means of stand-alone scanning probe microscopes. Correction in lateral direction is eliminated because all the light spot aggregates are moved together laterally and, therefore, are at rest with respect to one another. But correction still is required for distortions of measurement values caused by vertical movement of the probe 5 with respect to the remainder of the light spot elements. The origin of this distortion of measurement values is the parallel offset of the reflected measuring light rays 21a that is dependent on the vertical excursion of the probe 5.

Figure 3:
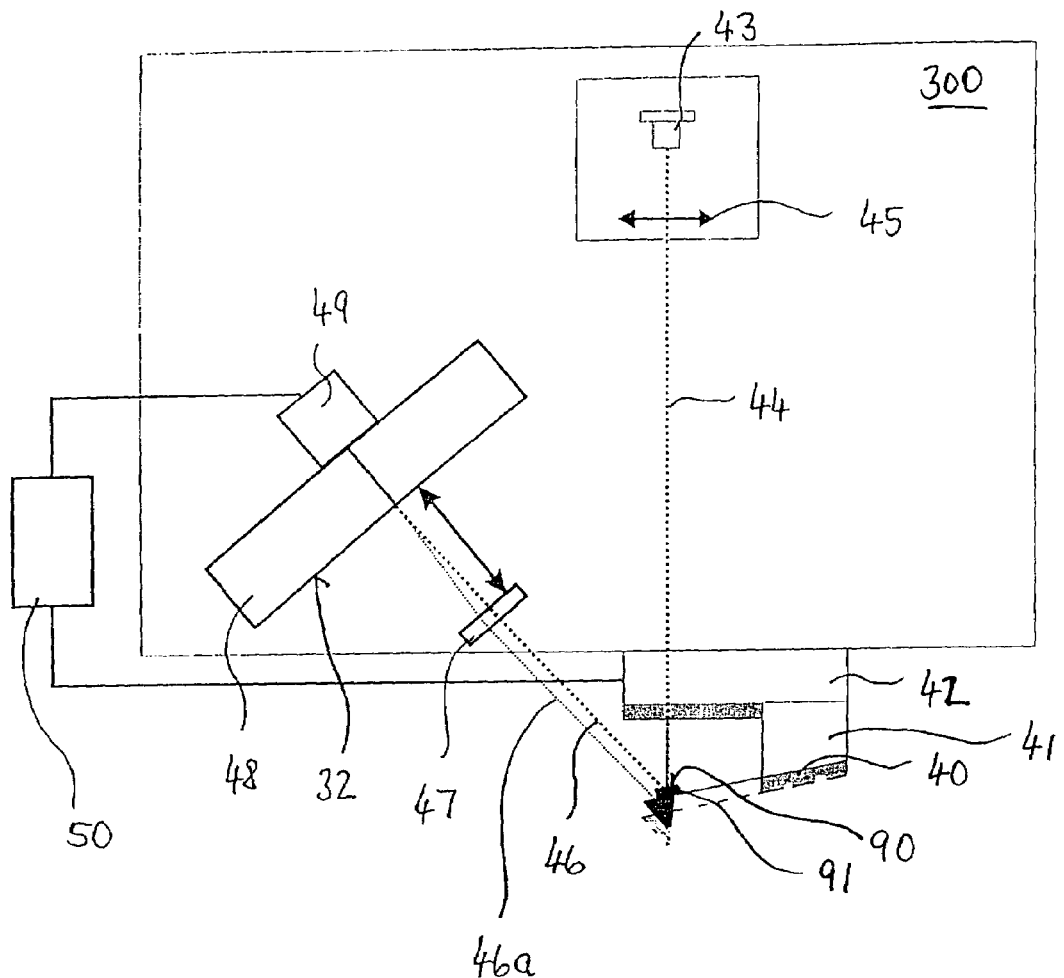
FIG. 3 is a diagrammatic illustration of another measuring assembly for a scanning probe microscope, comprising a correction lens system.

FIG. 3 is a diagrammatic presentation of a light spot apparatus 300 for a stand-alone scanning probe microscope, especially a scanning force microscope. As shown in FIG. 3, a probe 40 is connected by a fastening unit 41 to a vertical adjustment unit 42 which extends in z-direction. When performing measurements according to the light spot principle, the light spot apparatus 300, comprising the light source 43, a focussing lens 45, the correction lens 47, as well as the photodiode 48 and its associated circuitry 49 in the embodiment according to FIG. 3, is moved laterally as a whole together with the probe 40 and the fastening unit 41 as well as the vertical adjustment means 42. To this end, the light source 43, a focussing lens 45, the correction lens 47, the photodiode 48 and its circuitry 49 are connected mechanically to the lateral shifting unit (not shown in FIG. 3) of the scanning probe microscope, as described above with reference to the embodiments shown in FIGS. 1 and 2 which likewise comprise the correction mechanism including the correction lens 47 to be discussed below. The essential factor is that all the light spot aggregates, including the probe can be displaced together in lateral direction and that, in vertical direction, the probe is displaceable with respect to the other aggregates. The measurement errors potentially occurring here are corrected, as will be explained in detail below.

A measuring light ray 44 generated by means of a light source 43 and, having left the light source 43, first passes through a focussing lens 45, impinges on the probe 40, and is reflected on a reflection surface 90 of a reflection means 91, such as a mirror, whereby a reflected measuring light ray 46 is produced which passes through a correction lens 47 to reach a photodiode 48. The correction lens 47 is marked by the same reference numeral in FIGS. 1 to 3. The photodiode 48 comprises electronic circuitry 49 which serves to process the measurement signals received by means of the photodiode 48. The photodiode 48 is coupled by the electronic circuitry 49 to a control means 50 which in turn is connected to the vertical adjustment means 42. A controlled magnitude is generated with the assistance of the control means 50 in response to the measurement signals received from the photodiode 48 for readjustment of the vertical adjustment means 42. In this manner, the probe 40 is displaced vertically in z-direction, as illustrated in dashed lines in FIG. 3.

Vertical displacement of the probe 40 by the adjustment means 42 results in relative movement of the probe 40 with respect to other light spot elements. After the displacement, an altered, reflected measuring light ray 46a which is offset parallel to the reflected measuring light ray 46 enters the correction lens 47. The correction lens 47 directs the altered, reflected measuring light ray 46a into the same area of the detector surface of the photodiode 48 as the reflected measuring light ray 46. To be able to do that, the correction lens 47 is disposed at a distance 51 from the detector surface of the photodiode 48 which distance substantially corresponds to the focal length of the correction lens 47. The correction lens 47 thus corrects the distortions of measured values described above which are caused by movement of the probe 40 in vertical direction or z-direction and, therefore, may also be referred to as a z-correction lens.

In the case of the embodiments shown in FIGS. 1 and 2, relative movement of the probe 5 with respect to other light spot elements is caused by actuation of the vertical shifting unit 4 because, from among the light spot elements, only the probe 5 is displaceable by the vertical shifting unit. The correction of errors thus caused is achieved by means of the correction lens 47 whose spacing from the detector surface of the photodiode 21 corresponds to the focal length of the correction lens 47 and, therefore, any reflected measuring light rays 21a which may be offset in parallel will not distort the measurement result. On the other hand, particularly the correction lens 47 and the prism 26 which guide the reflected measuring light rays 21a onto the photodiode 27 are coupled by a fastening unit 60 to the lateral shifting unit 1 so as to be moved together with the photodiode 27 and the remainder of the light spot elements.

The features of the invention disclosed in the specification above, in the claims and drawing may be significant for implementing the invention in its various embodiments, both individually and in any combination.

What is claimed is:

1. A method of measuring a specimen by means of a scanning probe microscope, comprising the steps of:
   displacing a probe with respect to a specimen by means of lateral and vertical shifting units to measure the specimen;
   generating measuring light rays by means of a light source and directing the measuring light rays to a reflection means disposed on the probe;
   reflecting the measuring light rays at the reflection means, thereby forming reflected measuring light rays; and
   generating a measurement signal by directing the reflected measuring light rays by means of a correction lens to a detector surface of a detector means, wherein said step of generating a measurement signal includes positioning the correction lens at a distance from the detector surface substantially corresponding to a focal length of the correction lens; moving the light source, the reflection means, and the detector means along in a lateral direction as the probe is displaced laterally so that the reflection means is maintained relatively at rest with respect to the light source and the detector means, and the reflection means is moved with respect to the light source and the detector means along a vertical direction as the probe is displaced vertically with respect to the specimen.

2. The method as claimed in claim 1, wherein said step of directing the measuring light rays includes directing the measuring light rays to the detector surface by means of an optical deflection means for deflecting the measuring light rays.

3. The method as claimed in claim 1, wherein said step of directing the reflected measuring light rays includes directing the reflected measuring light rays to the detector surface by means of a further optical deflection means.

4. The method as claimed in claim 1, further comprising the step of guiding the measuring light rays in a light path from the light source to the reflection means at least partly along a condenser light path.

5. The method as claimed in claim 1, further comprising the step of selecting a value of about 30 degrees for an angle of incidence of the measuring light rays with respect to a normal of a reflection surface of the reflection means.

6. The method as claimed in claim 1, further comprising the step of illuminating the specimen by a condenser light which spreads through a condenser light path.

7. An apparatus for measuring a specimen by means of a scanning probe microscope comprising:
   a lateral shifting unit for lateral displacement of a probe with respect to the specimen;
   a vertical shifting unit for vertical displacement of the probe with respect to the specimen;
   a light source for generating measuring light rays which may be directed along a light path to a reflection means disposed on the probe and for reflecting the measuring light rays at said reflection means so that reflected measuring light rays are formed;
   a detector means having a detector surface for generating a measurement signal when the reflected measuring light rays impinge on said detector surface; and
   a correction lens for focusing the reflected measuring light rays on said detector surface, said correction lens being positioned at a distance from said detector surface substantially corresponding to a focal length of said correction lens;
   said light source, said reflection means, and said detector means being coupled to said lateral shifting unit so as to be moved along, upon lateral displacement of said probe with respect to the specimen, along a lateral direction so that said reflection means is maintained relatively at rest relative to said light source and said detector means, and said reflection means being coupled to said vertical shifting unit such that said reflection means is moved along a vertical direction with respect to said light source and said detector means upon vertical displacement of said probe with respect to the specimen.

8. The apparatus as claimed in claim 7, further comprising an optical deflection means for guiding the measuring light rays to said reflection means.

9. The apparatus as claimed in claim 7, further comprising further optical deflection means for guiding the reflected measuring light rays to said detector surface of said detector means.

10. The apparatus as claimed in claim 7, wherein the light path of the measuring light rays from said light source to said reflection means is formed at least partly along a condenser light path.

11. The apparatus as claimed in claim 7, wherein a reflection surface of said reflection means is inclined with respect to a central axis of said lateral shifting unit.

* * * * *